United States Patent
Wong et al.

(10) Patent No.: US 10,057,442 B2
(45) Date of Patent: Aug. 21, 2018

(54) MEDIA WIDTH SENSING

(71) Applicant: Intermec Technologies Corporation, Fort Mill, SC (US)

(72) Inventors: Boon Hao Wong, Singapore (SG); Sze Ping Ching, Singapore (SG)

(73) Assignee: Intermec Technologies Corporation, Fort Mill, SC (US)

( * ) Notice: Subject to any disclaimer, the term of this patent is extended or adjusted under 35 U.S.C. 154(b) by 0 days.

(21) Appl. No.: 15/879,563

(22) Filed: Jan. 25, 2018

(65) Prior Publication Data

US 2018/0152567 A1 May 31, 2018

Related U.S. Application Data

(63) Continuation of application No. 15/642,868, filed on Jul. 6, 2017, now Pat. No. 9,883,063, which is a continuation of application No. 14/923,723, filed on Oct. 27, 2015, now Pat. No. 9,876,923.

(51) Int. Cl.
*H04N 1/00* (2006.01)
*H04N 1/32* (2006.01)
*G06K 9/20* (2006.01)

(52) U.S. Cl.
CPC ......... *H04N 1/0071* (2013.01); *H04N 1/0057* (2013.01); *H04N 1/00724* (2013.01); *H04N 1/32133* (2013.01); *G06K 9/2063* (2013.01); *H04N 1/00708* (2013.01); *H04N 1/00718* (2013.01)

(58) Field of Classification Search
None
See application file for complete search history.

(56) References Cited

U.S. PATENT DOCUMENTS

| | | | |
|---|---|---|---|
| 4,647,189 A | | 3/1987 | Fujiwara et al. |
| 4,903,067 A | * | 2/1990 | Murayama ......... G03G 15/1655 347/116 |
| 6,008,826 A | * | 12/1999 | Foote ................. G03G 15/0194 347/116 |
| 6,832,725 B2 | | 12/2004 | Gardiner et al. |
| 7,128,266 B2 | | 10/2006 | Zhu et al. |
| 7,159,783 B2 | | 1/2007 | Walczyk et al. |
| 7,413,127 B2 | | 8/2008 | Ehrhart et al. |
| 7,726,575 B2 | | 6/2010 | Wang et al. |
| 8,294,969 B2 | | 10/2012 | Plesko |
| 8,317,105 B2 | | 11/2012 | Kotlarsky et al. |
| 8,322,622 B2 | | 12/2012 | Liu |
| 8,366,005 B2 | | 2/2013 | Kotlarsky et al. |

(Continued)

FOREIGN PATENT DOCUMENTS

WO 2013163789 A1 11/2013

*Primary Examiner* — Miya J Williams
(74) *Attorney, Agent, or Firm* — Additon, Higgins & Pendleton, P.A.

(57) ABSTRACT

Printing a graphic media product is described. The media product has an indicia marked on a media substrate. An installation of a supply of the media substrate is detected. A sensor is activated based on the detection of the installation. The activated sensor measures a width of the installed media substrate. A center position of the media substrate is computed based on the measured width. The marking of the indicia upon the media substrate is aligned relative to the computed center position of the media substrate.

20 Claims, 7 Drawing Sheets

(56) References Cited

U.S. PATENT DOCUMENTS

| | | |
|---|---|---|
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,653 B2 | 11/2014 | Koda |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |

(56) References Cited

U.S. PATENT DOCUMENTS

| | | |
|---|---|---|
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wangu |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,596 B1 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |

(56) References Cited

U.S. PATENT DOCUMENTS

| | | |
|---|---|---|
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 9,876,923 B2 | 1/2018 | Wong et al. |
| 9,883,063 B2 | 1/2018 | Wong et al. |
| 2004/0061733 A1* | 4/2004 | Buibas ............... B41J 3/4071 347/19 |
| 2005/0248799 A1* | 11/2005 | Takatsuna ............ G06K 15/00 358/1.13 |
| 2006/0065744 A1* | 3/2006 | Tai .................. G06K 19/07749 235/492 |
| 2007/0063048 A1 | 3/2007 | Havens et al. |
| 2009/0134221 A1 | 5/2009 | Zhu et al. |
| 2009/0147298 A1 | 6/2009 | Takahashi et al. |
| 2010/0150580 A1* | 6/2010 | Brumbaugh ........ B41J 11/009 399/16 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0286449 A1* | 10/2013 | Fujiwara ............ H04N 1/3877 358/498 |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0100813 A1 | 1/2014 | Showering |
| 2014/0034734 A1 | 2/2014 | Sauerwein |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0168787 A1 | 6/2014 | Wang et al. |
| 2014/0175165 A1 | 6/2014 | Havens et al. |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |

(56) References Cited

U.S. PATENT DOCUMENTS

| | | |
|---|---|---|
| 2015/0149946 A1 | 5/2015 | Benos et al. |
| 2015/0161429 A1 | 6/2015 | Xian |
| 2015/0186703 A1 | 7/2015 | Chen et al. |
| 2015/0199957 A1 | 7/2015 | Funyak et al. |
| 2015/0207941 A1 | 7/2015 | Koda et al. |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0310243 A1 | 10/2015 | Ackley |
| 2015/0310389 A1 | 10/2015 | Crimm et al. |
| 2015/0327012 A1 | 11/2015 | Bian et al. |
| 2015/0371116 A1* | 12/2015 | Tanigawa ............ G06K 15/027 358/1.14 |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Percorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschinie et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |

(56) References Cited

U.S. PATENT DOCUMENTS

| | | |
|---|---|---|
| 2017/0193461 A1 | 7/2017 | Jonas et al. |
| 2017/0193727 A1 | 7/2017 | Van Horn et al. |
| 2017/0200108 A1 | 7/2017 | Au et al. |
| 2017/0200275 A1 | 7/2017 | McCloskey et al. |

* cited by examiner

EXAMPLE CENTER TRACKING PRINTER 20 ("DESKTOP" PRINTING USE)

EXAMPLE CENTER TRACKING DESKTOP PRINTER 20 CONFIGURATION

MEDIA WIDTH SENSING

CROSS-REFERENCE TO RELATED APPLICATION

The present application claims the benefit of U.S. patent application Ser. No. 15/642,868 for Media Width Sensing filed Jul. 6, 2017 (and published Oct. 19, 2017 as U.S. Patent Application Publication No. 2017/0302805), now U.S. Pat. No. 9,883,063, which claims the benefit of U.S. patent application Ser. No. 14/923,723 for Media Width Sensing filed Oct. 27, 2015 (and published Apr. 27, 2017 as U.S. Patent Publication No. 2017/0118355), now U.S. Pat. No. 9,876,923. Each of the foregoing patent applications, patent publications, and patents is hereby incorporated by reference in its entirety.

TECHNOLOGY FIELD

The present invention relates generally to printing. More particularly, example embodiments of the present invention relate to alignment of printed indicia on media substrates.

BACKGROUND

Generally speaking, graphic media products present information visually to viewers. The graphic media products may comprise symbols, one dimensional (1D) and two dimensional (2D) data patterns such as barcodes and matrix code patterns, text, graphics, images, emblems, and other indicia (collectively, "indicia"), which may be marked on a blank media substrate by various printing systems ("printers").

The clarity with which a printer marks the indicia on the medium is significant to the effectiveness with which the graphic media product presents the information and thus, to the intelligibility, legibility, and usefulness of the information to the viewers. To promote the clear marking of the indicia, various clarity criteria, expectations, specifications, and standards have emerged and/or been established.

For example, data patterns may be printed to comply with a programmed quality specification, and/or to quality standards promulgated by the American National Standards Institute (ANSI), International Electrotechnical Commission (IEC) International Organization for Standardization (ISO), and other authorities. Thus, 1D Universal Product Code (UPC) and 2D matrix data patterns may be specified to comply with quality specifications set forth in the 'ANSI/UCC5' standard.

Further, 1D International (or/also "European") Article Number (EAN) and UPC/EAN linear barcode patterns may be specified to comply with quality specifications set forth in the 'ISO/IEC 12516' standard. PDF417 data code patterns pattern, which comprise four vertical bar symbols disposed over 17 horizontally disposed spacer symbols, may be specified to comply with the ISO/EC-15438 standard. Quick Response (QR), Han Xin, and other 2D data patterns may be specified to comply with quality specifications set forth in the 'ISO/IEC 15415' standard. Text may be printed to conform to any of a variety of specified fonts, styles, and/or optical character recognition (OCR) standards.

In addition to specific application to the appearance with which the indicia themselves are marked, the position at which the indicia are marked upon the media substrate may also be significant to the effectiveness with which the graphic media product presents the information and thus again, to the intelligibility, legibility, and usefulness of the information to the viewers. Some graphic media products may be used with applications in which the accuracy with which the indicia are marked on the media substrate may be especially significant.

For example, labels are typically applied onto containers and packaging used for dispensing medicines, such as narcotics, radiopharmaceuticals and other therapeutic or diagnostic drugs. As such, the labels may be applied for the purpose of providing important information to users of the item. The information may relate to the safe use of the items and/or precautions, "side-effects," hazards, and/or dangers associated with using the item.

In such uses, the print quality specifications may comprise significant rigor with respect to strictures for heightened levels of accuracy in relation to a specified target position, and precision in relation to the uniformity with which the markings are applied repetitively to the specified target positions over a printing run of multiple labels or other print products. Printers are thus designed and configured to position the marking of the indicia onto the media substrate. For example, some printers may be configured for a 'left justification' of the markings, or for center tracking.

The media substrate may comprise a web of paper, plastic, or other materials upon which the indicia may be marked. The media substrate may comprise a stack of individual blank pages disposed in a tray, from which it may be drawn by a feed mechanism of the printer and fed into a marking mechanism thereof for the marking of the indicia thereon. The web may also, or alternatively, comprise a rolled configuration disposed upon a spool, or an accordion-like configuration disposed in a magazine.

The indicia may comprise a pattern formed by application of plurality of dots or other picture elements (pixels) of a marking agent, such as an ink or a thermally sensitive marking material, by the printing mechanism to the media substrate. The media width may be measured in relation to the total number of dots or other pixels along a horizontal line from one lateral edge of the media substrate to the opposite lateral edge thereof.

Printers may be left justifying or center tracking. Left justifying printers align the printing with reference to the left-most lateral edge of the media substrate. Center tracking printers align the marking of the indicia relative to a center position of the media substrate. The center position runs longitudinally in relation to the direction of feed and/or print, and parallel and equidistant to each of the opposite lateral edges of the media substrate.

With center tracking printers, users' knowledge of the correct width of the media substrate, and configuring a corresponding setting are significant to correct printing of media products conforming to quality standards and specifications, and the clear communication of information presented therewith. Errors relating to the correct width measurement and the corresponding setting configurations can lead to printing failures or faulty and/or 'out-of-specification' print products.

Such errors may relate to erroneous manual calculations or unit conversion performed by the users, the precision of the measurement devices or accuracy of estimates and the effects of measurement related deviation factors. The errors may also relate to the use of external tools, such as associated software and/or printer webpages, to configure the printer settings corresponding to the media width.

Moreover, the errors are associated with a single media measuring process cycle. A media width measurement cycle begins anew upon a subsequent change to a medium of a different width. Thus, errors relating to media width measurement and setting configuration may recur or deteriorate, with subsequent failures or faulty, out-of-specification print products.

It could be useful, therefore, to reduce reliance on users' knowledge and memory in configuring correct width settings for various media substrates. It could also be useful to configure the width settings with sufficient correctness for printing of media products in conformance to quality standards and specifications, and to promote the clear communication of information presented therewith. Further, it could be useful to reduce errors relating to the correct width measurement and the corresponding setting configurations, and related occurrence of printing failures or faulty and/or out-of-specification print products.

SUMMARY

Accordingly, in one aspect, an example embodiment of the present invention relates to printing a graphic media product. Example embodiments reduce reliance on users' knowledge and memory in configuring correct width settings for various media substrates. Example embodiments configure the width settings with sufficient correctness for printing of media products in conformance to quality standards and specifications, and to promote the clear communication of information presented therewith. Further, example embodiments reduce errors relating to the correct width measurement and the corresponding setting configurations, and related occurrence of printing failures or faulty and/or out-of-specification print products.

An example embodiment of the present invention relates to a system for printing a graphic media product. The graphic media product comprises an indicia marked upon a media substrate. The system comprises a print mechanism, a detector, a sensor, and a processor operable for computing a center position of the media substrate.

The print mechanism is operable for marking the indicia upon the media substrate. The detector is operable for detecting an installation of a supply of the media substrate for feeding to the print mechanism, and for activating the sensor based on the detection of the installation of the media substrate. The sensor is operable for measuring a width of the installed media substrate. The processor is operable for computing a center position of the media substrate based on the measured width. The marking of the indicia is aligned relative to the computed center position of the media substrate.

In an example embodiment of the present invention, the media substrate comprises a plurality of marks. The marks are disposed along at least one line perpendicular to a line running longitudinally along a length of a plane corresponding to a surface of the media substrate and/or equidistant between a pair of opposing lateral edges thereof, and each of the a pair of opposing lateral edges. The media substrate may also comprise a plurality of gaps between each of the marks. The gaps comprise a shade and/or a brightness at least approximating a shade or a brightness of the media substrate. The marks comprise a shade and/or a brightness darker than that of the gaps. In an example embodiment, the measuring the width of the installed media substrate with the activated sensor, and/or the computing the center position of the media substrate based on the measured width, comprises counting the gaps, and/or counting the marks.

An example embodiment of the present invention relates to a method for printing a graphic media product. The media product comprises an indicia marked on a media substrate. An installation of a supply of the media substrate is detected.

A sensor is activated based on the detection of the installation. The activated sensor measures a width of the installed media substrate. A center position of the media substrate is computed based on the measured width. The marking of the indicia upon the media substrate is aligned relative to the computed center position of the media substrate. An example embodiment may be implemented in which the system summarized above is operable for performing the method for printing a graphic media product.

An example embodiment of the present invention relates to a graphic media product, which is printed by a process for marking an indicia upon a media substrate. The printing process may comprise one or more of the method steps summarized above.

An example embodiment of the present invention relates to a non-transitory computer readable storage medium comprising instructions, which when executed by one or more computer processors controls and/or causes performance of the method for printing a graphic media product summarized above.

The foregoing illustrative summary, as well as other example features, functions and/or aspects of embodiments of the invention, and the manner in which the same are accomplished, are further explained within the following detailed description of example embodiments and each figure ("FIG.") of the accompanying drawings.

DESCRIPTION OF EXAMPLE EMBODIMENTS

Figure 1:
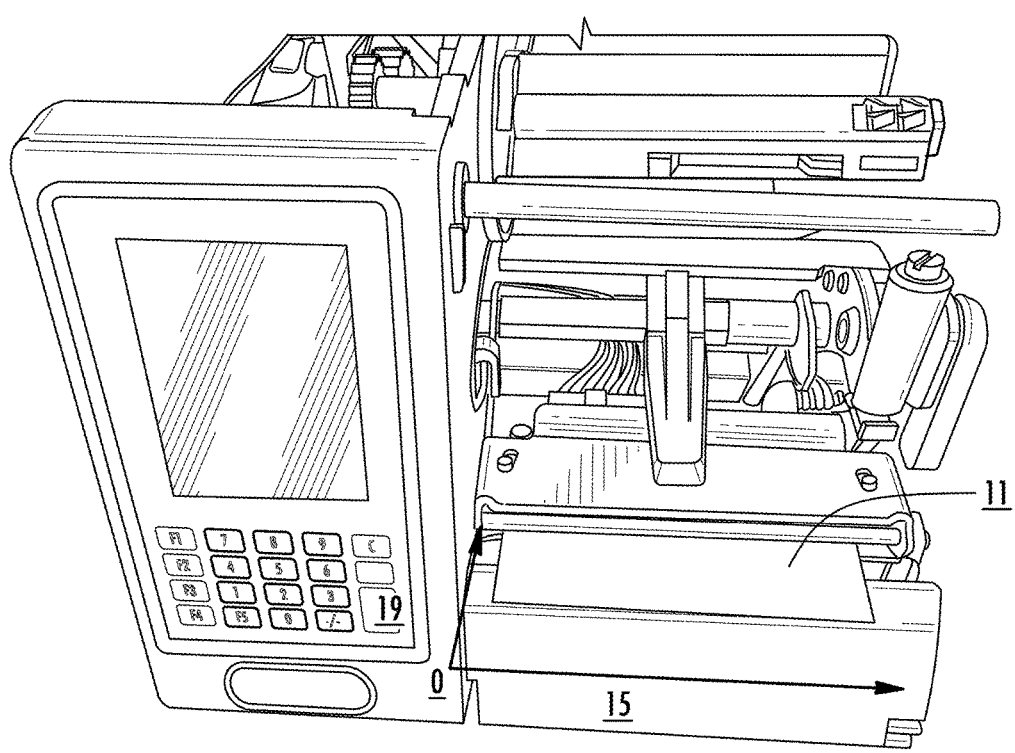
FIG. 1 depicts a typical left justifying printer, for comparison to an example embodiment of the present invention.

Example embodiments of the present invention are described in relation to systems and methods for printing an indicia on a graphic medium. In an example embodiment, a system for printing the indicia on the graphic medium comprises an indicia marked upon a media substrate. The system comprises a print mechanism, a detector, a sensor, and a processor operable for computing a center position of the media substrate.

The print mechanism is operable for marking the indicia upon the media substrate. The detector is operable for detecting an installation of a supply of the media substrate for feeding to the print mechanism, and for activating the sensor based on the detection of the installation of the media substrate. The sensor is operable for measuring a width of the installed media substrate. The processor is operable for computing a center position of the media substrate based on the measured width. The marking of the indicia is aligned relative to the computed center position of the media substrate.

Overview.

An example embodiment of the present invention relates to a method for printing a graphic media product. The media product comprises an indicia marked on a media substrate. An installation of a supply of the media substrate is detected. A sensor is activated based on the detection of the installation. The activated sensor measures a width of the installed media substrate. A center position of the media substrate is computed based on the measured width. The marking of the indicia upon the media substrate is aligned relative to the computed center position of the media substrate.

The media substrate is fed to a print head along a direction of the feeding and the printing of the graphic media product. The computed center position is located along a line running longitudinally along a length of a plane corresponding to a surface of the media substrate and equidistant between a pair of opposing lateral edges thereof.

The media substrate is fed in a direction of the feeding and the printing of the graphic media product, and the length of the plane may be measured over the surface of the fed media substrate. The length may be measured along the longitudinal line on which the computed center position is located.

The computation of the center position of the media substrate based on the measured width may comprise tracking a number of setting adjustments inputted in relation to configuring a setting corresponding to the measured width.

Prior to the marking of the indicia, the media substrate is blank. As used herein, the term "blank" may refer to a substantially unmarked substrate of the print medium.

A substantially blank print media substrate supplied for printing graphic media products. As used in this sense, the term "substantially blank" refers to the media substrate comprising an unmarked state in relation to any printed indicia, except for any identifiers, descriptors, and/or "watermarks" or other security (or other) features, which if present, are intended to typically escape common perceptual notice not directed specifically thereto. The substantially blank media substrate comprises, in this sense, virgin media ready to be marked with the printed indicia.

In an example embodiment, the substantially blank media substrate does comprise a plurality of marks such as dots, disposed along at least one line perpendicular to one or more of a line running longitudinally along a length of a plane corresponding to a surface of the media substrate and equidistant between a pair of opposing lateral edges thereof, and each of a pair of opposing lateral edges.

The media substrate further comprises a plurality of gaps between each of the marks, wherein the gaps comprise one or more of a shade or a brightness at least approximating a shade or a brightness of the media substrate, wherein the marks comprise one or more of a shade or a brightness darker than that of the gaps. An example embodiment may be implemented in which, while the dots or other marks and/or the gaps between them are detectable by a sensor, they are neither readily, or intentionally noticeable or perceptible to users of the media (unless, e.g., knowledgeable users are specifically seeking to observe them), nor will they substantially mar or interfere with, or comprise a readily noticeable component of, or artifact displayed with, information presented by substantive indicia marked (e.g., subsequently) upon the media substrate.

The measuring of the width of the installed media substrate with the activated sensor, and/or the computing the center position of the media substrate based on the measured width may comprise counting the marks. Alternatively or additionally, the measuring of the width of the installed media substrate with the activated sensor, and/or the computing the center position of the media substrate based on the measured width may comprise counting the gaps between the marks.

An example embodiment of the present invention relates to a graphic media product, which is printed by a process for marking an indicia upon a media substrate. The printing process may comprise one or more of the method steps described above.

An example embodiment of the present invention relates to a non-transitory computer readable storage medium comprising instructions, which when executed by one or more computer processors controls and/or causes performance of the method for printing a graphic media product described above.

An example embodiment of the present invention relates to a system for printing a graphic media product. The graphic media product comprises an indicia marked upon a media substrate. The system comprises a print mechanism, a detector, a sensor, and a processor operable for computing a center position of the media substrate. The print mechanism is operable for marking the indicia upon the media substrate. The detector is operable for detecting an installation of a supply of the media substrate for feeding to the print mechanism, and for activating the sensor based on the detection of the installation of the media substrate. The sensor is operable for measuring a width of the installed media substrate. A processor is operable for computing a center position of the media substrate based on the measured width. The marking of the indicia is aligned relative to the computed center position of the media substrate.

The system may also comprise a feeder mechanism. The feeder is operable for feeding the media substrate to the print mechanism. The media substrate is fed along a direction of the feeding and the printing of the graphic media product.

The computed center position is located along a line running longitudinally along a length of a plane corresponding to a surface of the media substrate and equidistant between a pair of opposing lateral edges thereof. The sensor may be operable further for measuring the length of the plane over the surface of the fed media substrate. The length may be measured along the longitudinal line on which the computed center position is located.

The system may further comprise an input mechanism. The input mechanism is operable for inputting one or more setting adjustments over an adjustment range in relation to configuring a setting corresponding to the measured width inputted.

In an example embodiment of the present invention, the media substrate comprises a plurality of marks. The marks are disposed along at least one line perpendicular to a line running longitudinally along a length of a plane corresponding to a surface of the media substrate and/or equidistant between a pair of opposing lateral edges thereof, and each of a pair of opposing lateral edges. The media substrate may also comprise a plurality of gaps between each of the marks. The gaps comprise a shade and/or a brightness at least approximating a shade or a brightness of the media substrate. The marks comprise a shade and/or a brightness darker than that of the gaps. In an example embodiment, the measuring the width of the installed media substrate with the activated sensor, and/or the computing the center position of the media substrate based on the measured width, comprises counting the gaps, and/or counting the marks.

The graphic media product comprises the indicia marked upon the media substrate. The print medium may comprise a thermally markable material. The thermally markable material is heat sensitive. A thermal print head (TPH) printing mechanism is operable for marking the indicia upon the thermally sensitive medium by controllably heating dots or other pixels at target positions distributed over the marking surface of the media substrate, which correspond to components of the indicia, such as portions of a symbol. At each of the locally heated positions, the medium may darken chemically from a lighter shade or color to a darker shade or color (or vice versa), or a thermally transferred material may be transferred from a marking substrate to darken a lighter colored or shaded media substrate base (or vice versa).

Other media substrates may be marked by other techniques. For example, the media substrate may comprise paper, plastic, and/or other markable materials. Paper based print media may be marked with ink based marking materials. Metallic or other media substrates may be etched by lasers, or with print mechanisms operable for controllably applying a chemical etching material such as acids or other solvents.

Example embodiments of the present invention are thus useful for printing graphic media products. Example embodiments reduce reliance on users' knowledge and memory in configuring correct width settings for various media substrates. Example embodiments configure the width settings with sufficient correctness for printing of media products in conformance to quality standards and specifications, and to promote the clear communication of information presented therewith. Further, example embodiments reduce errors relating to the correct width measurement and the corresponding setting configurations, and related occurrence of printing failures or faulty and/or out-of-specification print products.

Example Center Tracking Printing System.

An example embodiment of the present invention relates to a system for printing a graphic media product. The center tracking printing system may comprise a feature of a printer apparatus used in a desk-top of other (e.g., industrial) use, environment, situation, application, circumstance, endeavor, etc.

Figure 2A:
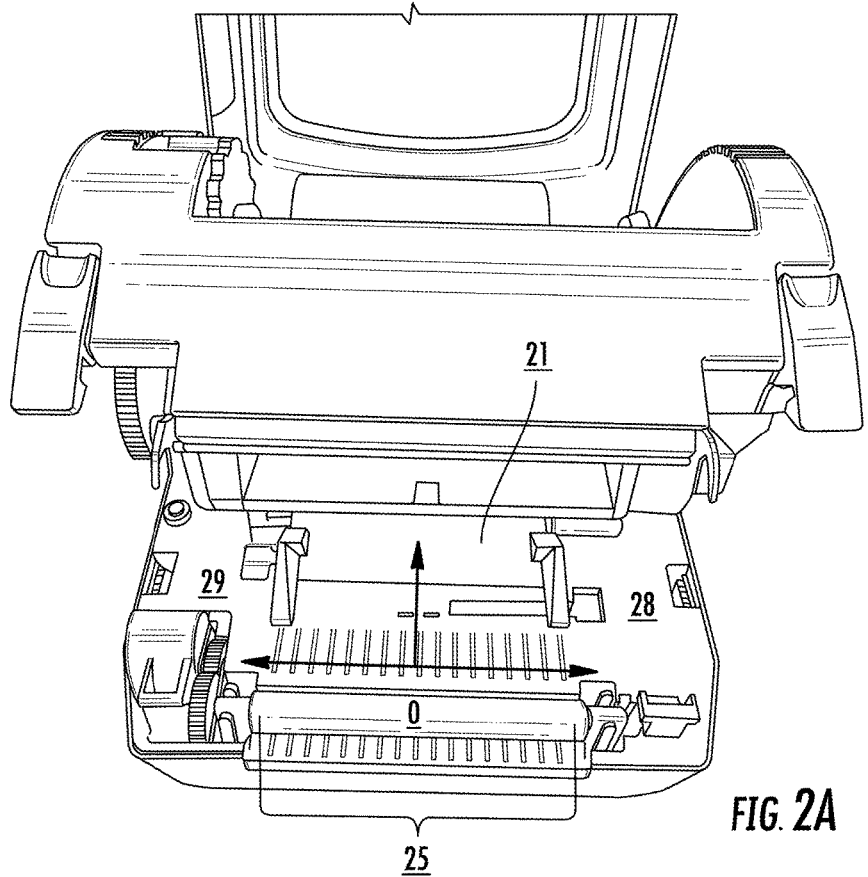
FIG. 2A depicts an example center tracking printer in a "desktop printing" use, according to an embodiment of the present invention.

FIG. 2A depicts an example center tracking printer 20 in a "desktop printing" use, according to an embodiment of the present invention. A media substrate 21 is loaded into a supply magazine, such as a "paper tray." The media substrate has a horizontal width 25, which spans the substrate 21 from a left edge 29 to an opposing right edge 28. A center line '0' runs longitudinally over the length of the substrate 21 equidistant between the left edge 29 and the right edge 21. The centerline 0 is tracked and the marking of an indicia on the substrate is aligned in relation to the tracked centerline.

FIG. 1 depicts a typical left justifying printer 10, for comparison to an example embodiment of the present invention. In contrast with example embodiments of the present invention, the left justifying printer 10 aligns a marking of indicia on a substrate 11 in relation to the left-most edge 19 of the substrate 19, which has a width 15.

Figure 2B:
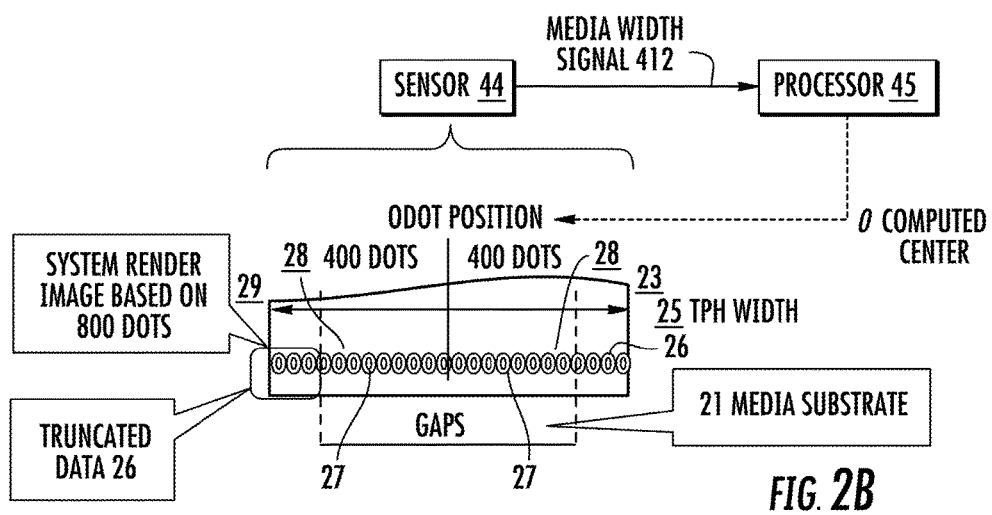
FIG. 2B depicts an example center tracking printer configuration, according to an embodiment of the present invention.

FIG. 2B depicts an example configuration of the center tracking printer 20, according to an embodiment of the present invention. The printer 20 comprises a sensor 44 operable for measuring the lateral width 25 of a media substrate 21, such as a label or other indicia may be marked. The width 25 of the media 21 substrate may correspond to the optimum or maximum width with which a TPH or other print head may operate. The sensor may be operable for measuring the media width by counting a number of equally sized dots 28 (or other pixel styles), and/or gaps 27 between the dots 28, laterally between the left edge 29 of the substrate 21 to the right edge 23 thereof.

For example, the TPH width 25 may comprise a span of 800 dots. A label or other media product of three inches (3 in.) width spans 600 dots and/or gaps. In an example embodiment, the sensor 44 automatically configures a corresponding printing width to span the 600 dots, etc. width. Moreover, the processor 45 computes the longitudinal 0 centerline equidistant between the left media edge 29 and the right media edge 23 and aligns the marking of the label or other indicia upon the substrate in relation to the computer 0 centerline. Truncated data 26 may appear to the left and the right of the label 21, each comprising a span of 100 dots, etc.

Figure 3A:
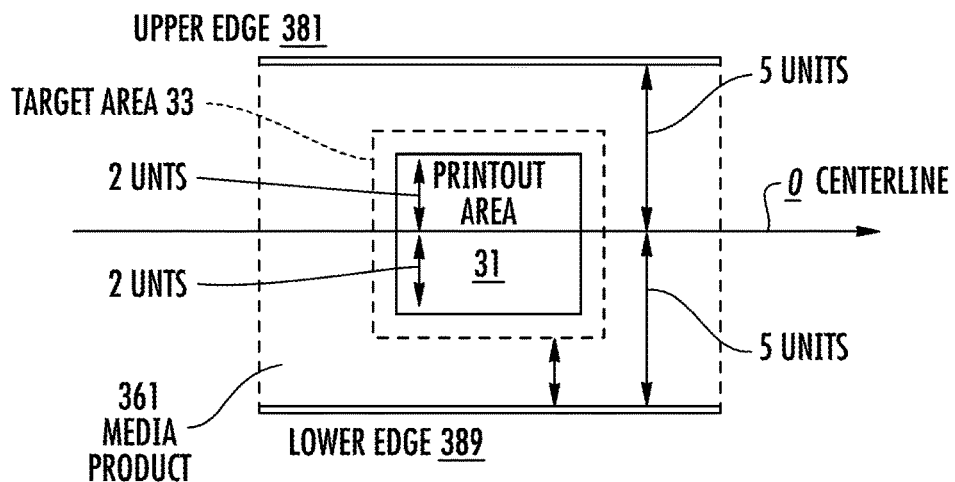
FIG. 3A depicts an example of centered printing, according to an embodiment of the present invention.

FIG. 3A depicts an example of centered printing, according to an embodiment of the present invention. The substrate of a graphic media product 31 comprises a first edge 381, and a second edge 389. The second edge 389 is parallel to and opposite from the first edge 381. Relative to the orientation of the indicia marked in the printout area 21, e.g., in which text symbols may be read (and/or graphic symbols observed) in a "right-side-up" orientation, the first edge 381 may comprise an "upper" edge, and the second edge 389 may comprise a "lower" edge, of the media products 31 (and 32).

A target area 33 corresponds to (e.g., matches spatially, covered by) the target position comprises an upper bound separated by a first designated distance, e.g., two vertical displacement units, from the computer 0 centerline of the graphic medium substrate 31, and a lower bound separated by a second designated distance, e.g., also two vertical displacement units, from the computer 0 centerline of the graphic medium substrate. In the centered printout 333, the printout 335 is positioned on, over, or within the target area 366, in alignment with the computer 0 centerline. The computer 0 centerline runs longitudinally over the substrate 31 equidistant from the upper edge 381 and the lower edge 389; five units from each of the edges. As used herein the term "centered" refers to the marking of the printout within the target position 33, disposed over the area and thus, with equidistant separation between its upper edge and its lower edge from the computed 0 centerline.

Figure 3B:
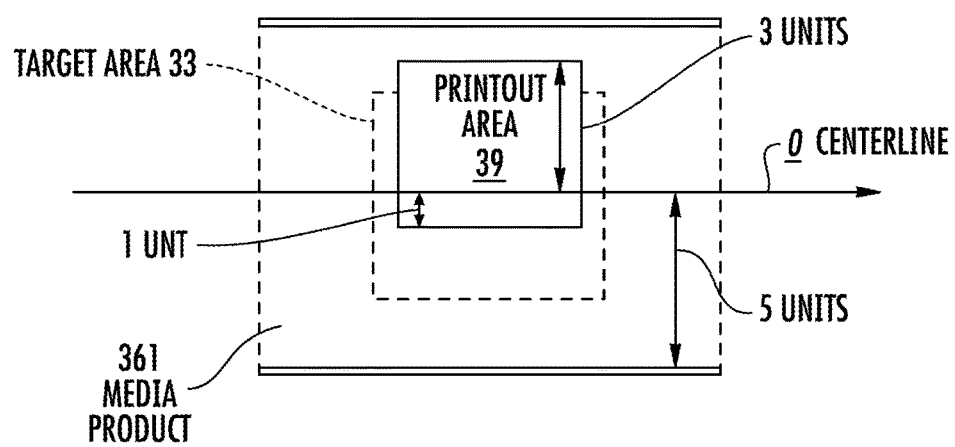
FIG. 3B depicts an example of off-center printing, for comparison to an embodiment of the present invention.

FIG. 3B depicts an example of off-center printing 39, for comparison to an embodiment of the present invention. While the vertical displacement of the upper edge of the printout area 39 from the computed 0 centerline of the media product 381 has increased to three vertical displacement units in the off-center printout 39, the vertical displacement of the lower edge to the computed 0 centerline has decreased to one unit. Example embodiments of the present invention align the printing of the printout area 39 in relation to the computed 0 centerline, and thus promote the production of the centered printout 31, while deterring production of off center printouts, such as the printout 39.

Example System for Printing a Graphic Media Product.

Figure 4:
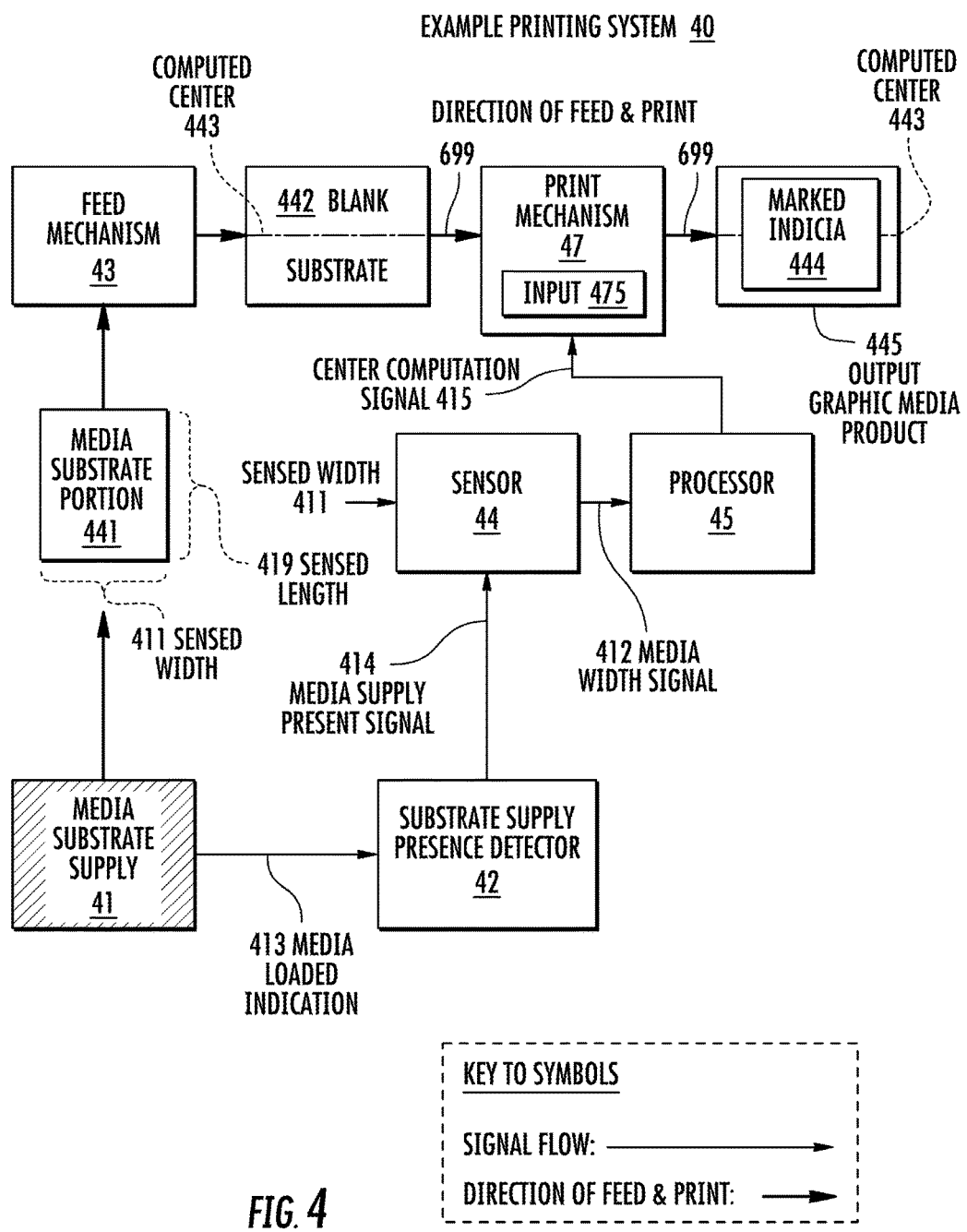
FIG. 4 depicts an example system for printing a graphic media product, according to an embodiment of the present invention.

An example embodiment of the present invention relates to a system for printing a graphic media product. FIG. 4 depicts an example system 40 for printing a graphic media product 445, according to an embodiment of the present invention. The graphic media product 445 comprises an indicia 444 marked upon a blank media substrate 442. The system 40 comprises a print mechanism 47, a detector 42, a sensor 44, and a processor 45 operable for computing a center position 443 of the media substrate 442.

The print mechanism 47 is operable for marking the indicia 444 upon the blank media substrate 442. The detector 42 is operable for detecting an installation of a supply 41 of the media substrate for feeding to the print mechanism, and for activating the sensor 44 based on the detection of the installation of the media substrate supply 41.

The detector 42 may detect the presence of the media substrate supply 41 based on a 'media loaded' indication 413, which may correspond to, e.g., electrically closing an electromechanical switch, optically activating (or deactivating) a photoelectric cell, ultrasonic detection, etc. The detector 42 may activate the sensor 44 with a 'media supply present' signal 414.

Upon activation by the detector 42, the sensor 44 is operable for measuring a lateral width 411 of the installed media substrate 41, such as over a surface of a portion (e.g., page) 441 of the media substrate, and for providing a corresponding media width signal 412 to a processor 45. The processor 45 is operable for computing the center position 443 of the media substrate (441, 442, 443) based on the measured width 411. The marking of the indicia 444 is aligned relative to the computed center position 443 of the media substrate 442, etc. For example, the processor 45 may control the print mechanism to align the marking of the indicia 444 according to the computer center position 443.

The system 40 may also comprise a feeder mechanism ("feeder") 43. The feeder 43 is operable for feeding the media substrate 442 to the print mechanism 47. The media substrate is fed along a direction 699 of the feeding and the printing of the graphic media product 445.

The computed center position 443 is located along a line running longitudinally along a length of a plane corresponding to a surface of the media substrate (442, 443) and equidistant between a pair of opposing lateral edges thereof. The sensor 44 may be operable further for measuring the length 419 of the plane over the surface of the fed media substrate. The length 419 may be measured along the longitudinal line on which the computed center position is located, or along a line parallel thereto.

The system may further comprise an input mechanism 475. The input mechanism 475 is operable for inputting one or more setting adjustments over an adjustment range in relation to configuring a setting corresponding to the measured width inputted.

In an example embodiment of the present invention, the media substrate comprises a plurality of marks 28 (FIG.2B). The marks 28 are disposed along at least one line perpendicular to a line running longitudinally along a length of a plane corresponding to a surface of the media substrate and/or equidistant between a pair of opposing lateral edges thereof, and each of a pair of opposing lateral edges.

The media substrate may also comprise a plurality of gaps 27 between each of the marks 28. The gaps 27 comprise a shade and/or a brightness at least approximating a shade or a brightness of the media substrate. The marks comprise a shade and/or a brightness darker than that of the gaps. In an example embodiment, the measuring the width of the installed media substrate with the activated sensor 44, and/or the computation by the processor 45 of the center position 443 of the media substrate based on the measured width 411, comprises counting the gaps 27, and/or counting the dots or other marks 28.

The system 40 is operable for performing a printing process. An example embodiment of the present invention relates to a method for printing a graphic media product.

Example Method for Printing a Graphic Media Product.

Figure 5:
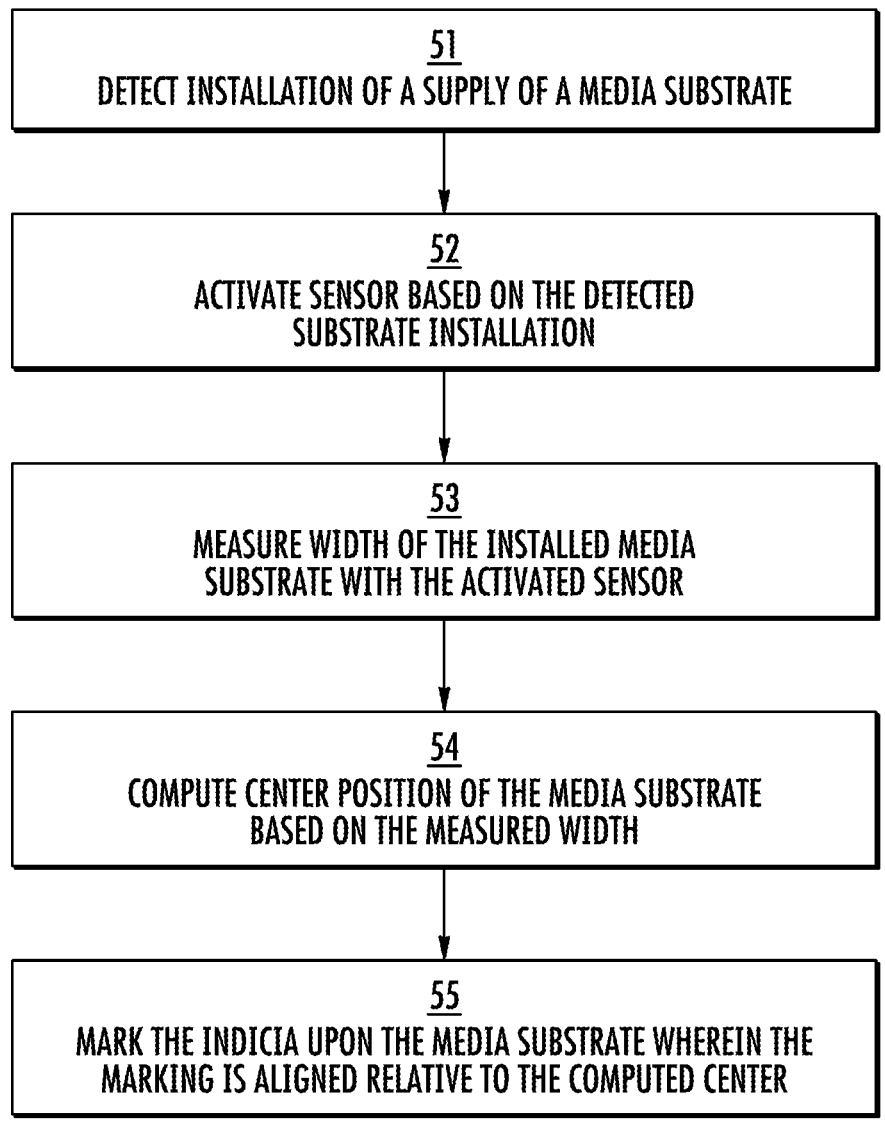
FIG. 5 depicts a flowchart for an example method for printing a graphic media product, according to an embodiment of the present invention.

FIG. 5 depicts a flowchart for an example method 50 for printing a graphic media product, according to an embodiment of the present invention. The system 40 (FIG.4) may be operable for performing the example method 50.

In step 51, an installation of a supply of the media substrate is detected.

In step 52, a sensor is activated based on the detection of the installation.

In step 53, the activated sensor measures a width of the installed media substrate.

In step 54, a center position of the media substrate is computed based on the measured width.

In step 55, the marking of the indicia upon the media substrate is aligned relative to the computed center position of the media substrate.

The media substrate is fed to a print head along a direction of the feeding and the printing of the graphic media product. The computed center position is located along a line running longitudinally along a length of a plane corresponding to a surface of the media substrate and equidistant between a pair of opposing lateral edges thereof.

The media substrate is fed in a direction of the feeding and the printing of the graphic media product, and the length of the plane may be measured over the surface of the fed media substrate. The length may be measured along the longitudinal line on which the computed center position is located (or a line parallel thereto).

The computation of the center position of the media substrate based on the measured width may comprise tracking a number of setting adjustments inputted in relation to configuring a setting corresponding to the measured width.

An example embodiment of the present invention relates to a non-transitory computer readable storage medium comprising instructions, which when executed by one or more computer processors controls and/or causes performance of a method for printing a graphic media product, such as the printing method 50, described above.

An example embodiment of the present invention relates to a graphic media product, which is printed by a process for marking an indicia upon a media substrate. The printing process may comprise one or more of the steps of the method 50, described above.

Example Graphic Media Products.

As used herein, the term "graphic media product" relates an indicia marked on a media substrate. Graphic media products may present or convey information visually, graphically, etc. to viewers.

The indicia may comprise one or more symbols. For example, the symbols may comprise text based information, such as alphanumeric, and/or character or syllabary based text. The symbol may also (or alternatively) comprise ideographic, pictographic, or emblematic based graphics, images, or data patterns.

For effective information presentation, data patterns may be subject to compliance with quality specifications promulgated by various standardization authorities. Such standards authorities include the American National Standards Institute (ANSI), International Electrotechnical Commission (IEC) International Organization for Standardization (ISO), and others.

Figure 6A:
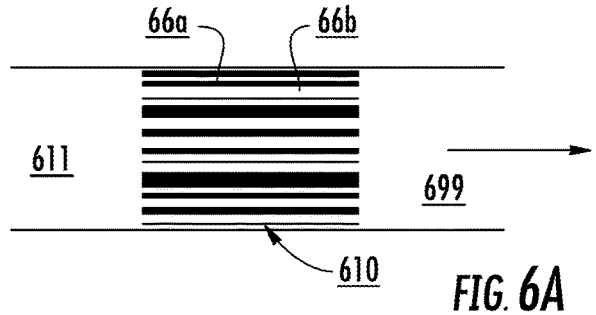
FIG. 6A depicts an example 1D 'drag' mode media product, according to an embodiment of the present invention.

For example, 1D Universal Product Code (UPC) and 2D matrix data patterns may be specified to comply with quality specifications set forth in the 'ANSI/UCC5' standard. Linear (1D) barcode patterns may be specified to comply with quality specifications set forth in the 'ISO/IEC 12516' standard. Quick Response (QR), Han Xin, and other 2D data patterns may be specified to comply with quality specifications set forth in the 'ISO/IEC 15415' standard FIG. 6A depicts an example 1D bar code pattern 610, according to an embodiment of the present invention. The 1D bar code symbol 610 is depicted as though printed in a 'ladder' or 'drag' mode on the print medium 611.

Figure 6B:
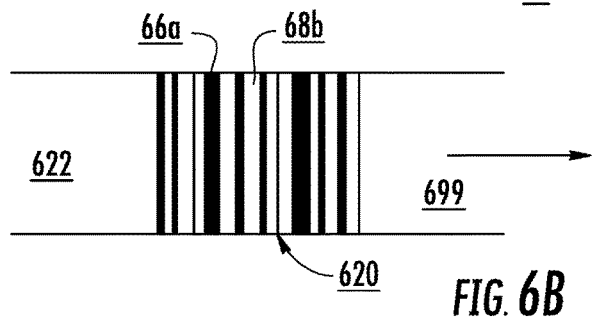
FIG. 6B depicts an example 1D 'picket fence' mode media product, according to an embodiment of the present invention.

FIG. 6B depicts another example 1D bar code pattern 620, according to an embodiment of the present invention. The 1D bar code symbol 622 is depicted as though printed in a 'picket fence' mode on a print medium 622.

The bar code symbols 610 and 620 each comprise a plurality of bar elements 66*a* and a plurality of space elements 68*b*. The space elements 68*b* are disposed in parallel with the bar elements 66*a*. In the drag mode, the bar code symbol 610 is printed parallel to the direction of printing 699. In the picket fence mode, the bar code symbol 620 is printed in a perpendicular orientation to the direction of printing 699.

The bar code symbols 610 and 620 may each comprise data patterns related to, for example, an International (or "European") Article Number and/or Universal Product Code (EAN/UPC symbology) pattern, PDF417 (ISO/EC-15438 related) pattern, which comprise four of the vertical bar like symbols 66*a* disposed over 17 of the horizontally disposed spacer symbols 68*b*), 1D dot code pattern, or other 1D symbols.

Figure 6C:
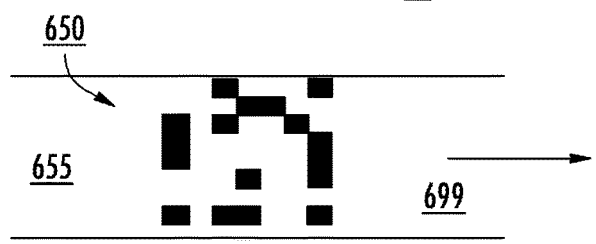
FIG. 6C depicts an example 2D media product, according to an embodiment of the present invention.

FIG. 6C depicts an example 2D matrix code pattern 650, according to an embodiment of the present invention. The 2D matrix code pattern 650 comprises a matrix of 2D graphic symbol parts, such as squares and other rectangle and polygons, printed on a print medium 655. The matrix data pattern 650 may comprise a 2D data pattern related to, for example, quick-response (QR) and/or Han Xin graphical or geometric data matrices, or other 2D symbols.

Figure 6D:
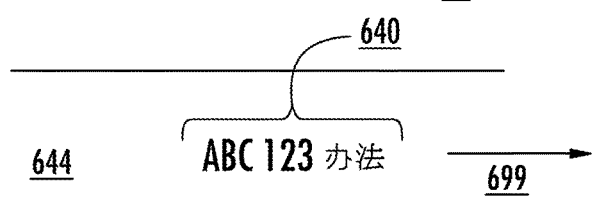
FIG. 6D depicts an example text based media product, according to an embodiment of the present invention.

FIG. 6D depicts an example text based code pattern 640, according to an embodiment of the present invention. The text based code pattern 640 comprises alphanumeric, character, or syllabary based text or other text related graphic symbol parts (e.g., OCR patterns), printed on a print medium 644. The code pattern 640 may comprise human readable and optical character recognition (OCR) readable symbol parts, such as numbers, letters, characters, and syllables printed on a print medium 644. The data pattern 640 may comprise a 2D data pattern related to, for example, OCR-B or OCR-A, or other 2D symbols.

The print media 611, 622, 644, and 655 each move longitudinally in a direction 699 of respective printing operations. The print media 611, 622, 644, and 655 may each comprise paper for receiving ink based markings, thermally sensitive paper, or plastic or other material. The print media 611, 622, 644, and 655 may be disposed in a web configuration, which is significantly longer than it is wide. The direction of printing 699 is parallel to a longitudinal axis of the print media 611, 622, 644, and 655, along which the media move.

The printing system 40 prints the symbols 610, 620, 640, and 650 on the respective web media 611, 622, 644, and 655 according to a printing process (e.g., method 50; FIG.5). An example embodiment may be implemented in which print logic generates a print command based on a reference pattern, to be printed centered in the target position. The print command and related reference pattern is used by a print driver to activate and energize print elements of the printing mechanism 47.

Responsive to the print command, for example, the activated and energized print mechanism 47 marks a part of the bar codes 610 and 620, matrix code 650 and/or text pattern 640 based on the reference pattern 305 and the media 611, 622, 644, and/or 655, respectively, advance in the direction 699. Each time that the media is advanced, a print driver activates elements of the print mechanism 112 for the marking of subsequent bar elements 66*a*, and spacing of parallel space elements 66*b*, onto a segment (e.g., portion) onto the media 611, 622, and 655, and/or the text pattern portions onto the medium 644.

As the printed portions of the media 611, 622, 644 and 655 advance through the print mechanism 47, the output printed graphic media product is produced. With 'linear' operable image heads, successive scan images of the printed element may be buffered sequentially into the scan memory area in a correspondence with the succession. The print command may be stored in a command related memory area.

An example embodiment of the present invention relates to a media product comprising an indicia printed on a graphic medium. The graphic media products may be printed by the method 50, described above with reference to FIG.5.

Example Computer and Network Platform.

An example embodiment may be implemented in which one or more components of the printing system 40 (e.g., processor 45, sensor 44, and/or detector 42) are configured in electronic or computer based hardware, software stored physically (e.g., electronically, optically, electromagnetically) in non-transitory computer readable storage media such as dynamic memory, flash memory, drives, caches, buffers, registers, latches, memory cells, or the like.

Figure 7:
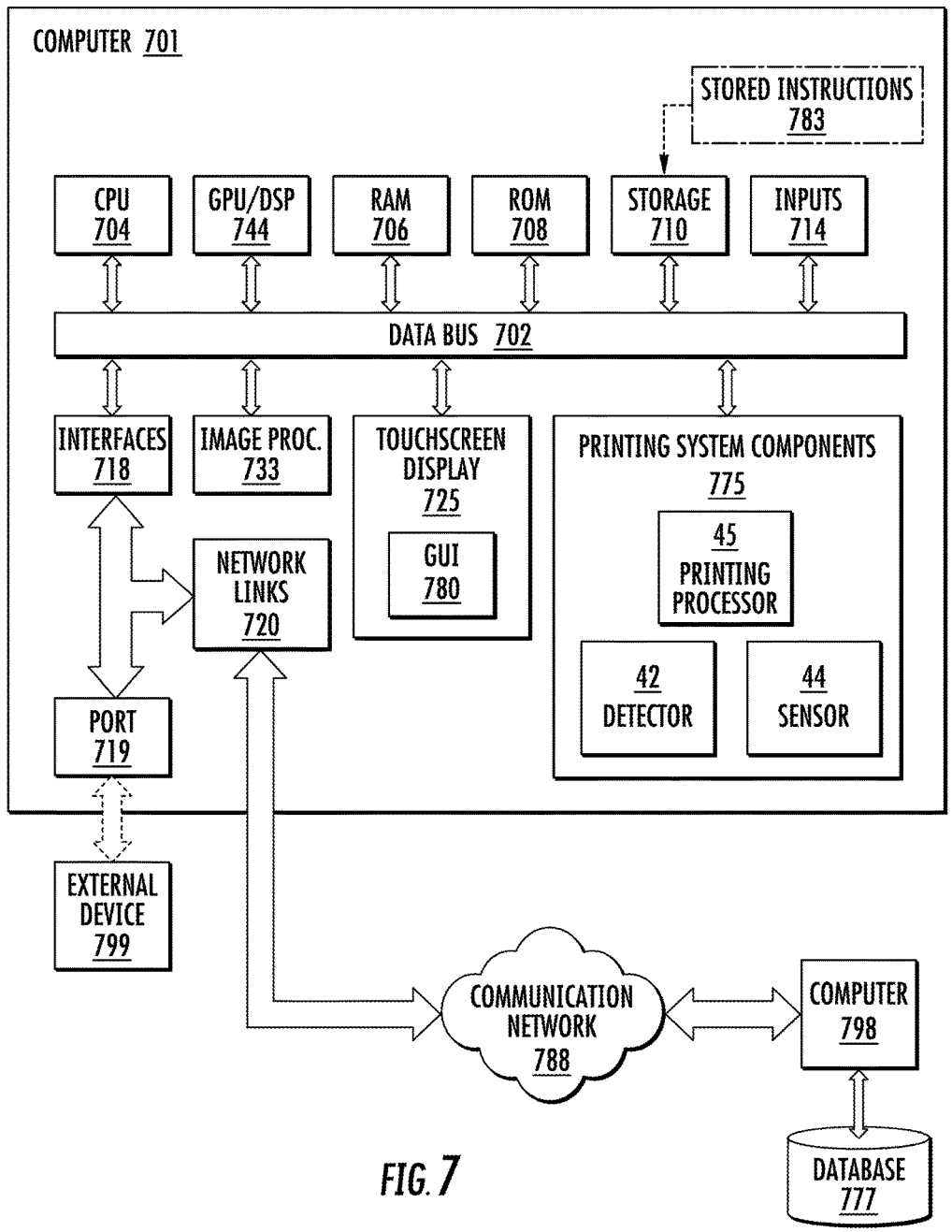
FIG. 7 depicts an example computer and network platform, with which an embodiment of the present invention may be practiced.

FIG. 7 depicts an example computer and network platform 700, with which an embodiment of the present invention may be practiced. The computer and network platform 700 comprises a first computer system ("computer") 701 and a data communication network 788.

The computer 701 comprises one or more components of the printer system 40 (e.g., product examiner 133). The computer 701 also comprises a touchscreen display 725. An example embodiment may be implemented in which the GUI 80 is rendered and actuated by the touchscreen display 725.

The network 788 may comprise a packet-switched data network operable based on transfer control and internetworking protocols (e.g., TCP/IP). The computer 701 may be coupled communicatively, and exchange data signals, over the data communication network 788 with at least a second computer 798, which is coupled communicatively with the data network 788.

The data network 788 may comprise a portion of one or more other networks and/or two or more sub-network ("subnet") components. For example, the data network 788 may comprise a portion of the internet and/or a particular wide area network (WAN). The network 788 may also comprise one or more WAN and/or local area network (LAN) subnet components. Portions of the data network 788 may be operable wirelessly and/or with wireline related means. The data network 788 may also comprise, at least in part, a communication network such as a digital telephone network.

An example embodiment may be implemented in which the computer 701 is operable for sending data to the computer 798 in relation to the operations of the print system 40 over the data network 788. The computer 798 may then store printer system operation related data in the database 777, from which it may be retrieved at a later time. The computer 701 may be operable for presenting a query to the computer 798 for input to the database 777, and for receiving corresponding replies, over the data communications network 788. An example embodiment may be implemented in which the product configuration database 94 is related to (e.g., comprises a component of, mirrors, or is mirrored by) the database 777.

The computer 701 comprises a plurality of electronic components, each of which is coupled to a data bus 702. The data bus 702 is operable for allowing each of the multiple, various electronic components of computer 701 to exchange data signals with each of the other electronic components.

The electronic components of the computer 701 may comprise integrated circuit (IC) devices, including one or more microprocessors. The electronic components of the computer 701 may also comprise other IC devices, such as a microcontroller, field-programmable gate array (FPGA) or other programmable logic device (PLD) or application-specific IC (ASIC).

The microprocessors may comprise a central processing unit (CPU) 704. The CPU 704 is operable for performing general data processing functions related to operations of the GRUI and other components of the computer 701. The electronic components of the computer 701 may also comprise one or more other processors 744.

For example, the other microprocessors may comprise a graphics processing unit (GPU) and/or digital signal processor (DSP) 704, which are each operable for performing data processing functions that may be somewhat more specialized than the general processing functions, as well as sometimes sharing some processing functions with the CPU 704.

One of the processors 744 may also be operable as a "math" (mathematics) coprocessor. The math co-processor, DSP and/or GPU ("DSP/GPU") 744 are operable for performing computationally intense data processing. The computationally intense processing may relate to imaging, image evaluation, graphics, dimension measurements, wireframe manipulations, coordinate system management, control, and other (e.g., mathematical, financial) information. One of the microprocessors may comprise the processor 45, of the print system 40.

The data processing operations comprise computations performed electronically by the image processor 333, CPU 704, and the DSP/GPU 744. The microprocessors may comprise components operable as an ALU, a FPU, and associated memory cells. The memory cells comprise non-transitory data storage media, which may be configured as caches (e.g., "L1," "L2"), registers, latches and/or buffers.

The memory cells are operable for storing data electronically in relation to various functions of the processor. A translational look-aside buffer (TLB) may be operable for optimizing efficiency of use of content-addressable memory (CAM) by the CPU 704, and/or the DSP/GPU 744, etc.

The computer 701 also comprises non-transitory computer readable storage media operable for storing data, e.g., electronically. For example, the computer readable storage media comprises a main memory 706, such as a random access memory (RAM) or other dynamic storage medium.

The main memory 706 is coupled to data bus 702 for storing information and instructions, which are to be executed by the CPU 704.

The main memory 706 may also be used for storing temporary variables or other intermediate information during execution of instructions by the CPU 704. Other memories (represented in the present description with reference to the RAM 706) may be installed for similar uses by the DSP/GPU 744.

The printing evaluation system 300 further comprises a read-only memory (ROM) 708 or other static storage medium coupled to the data bus 702. The ROM 708 is operable for storing static information and instructions for use by the CPU 704. In addition to the RAM 706 and the ROM 708, the non-transitory storage media may comprise at least one data storage device 710. The data storage device 710 is operable for storing information and instructions and allowing access thereto.

The data storage device 710 may comprise a magnetic disk drive, flash drive, or optical disk drive (or other non-transitory computer readable storage medium). The data storage device 710 comprises non-transitory media coupled to data bus 702, and may be operable for providing a "virtual memory" function. The virtual memory operations of the storage device 710 may supplement, at least temporarily, storage capacity of other non-transitory media, such as the RAM 706.

The non-transitory storage media comprises instructions 783, which are stored (e.g., electronically, magnetically, optically, physically, etc.) in relation to software for programming, controlling, and/or configuring operations of the computer 701 and its components, including the printing system 100, the camera 766, the GUI 80, etc. The instructions 783 may also relate to the performance of one or more steps of the printing method 20 (FIG.2A).

Instructions, programming, software, settings, values, and configurations, etc. related to the method 20, the printing system 100 and its components, and other operations of the computer 701 are stored (e.g., magnetically, electronically, optically, physically, etc.) by the storage medium 710, memory, etc.

The computer 701 comprises a user-interactive display configured as the touchscreen 725, which is operable as a combined display and GUI (e.g., GUI 80; FIG.8). The touchscreen 725 may comprise a liquid crystal display (LCD), which is operable for rendering images by modulating variable polarization states of an array of liquid crystal transistor components. The touchscreen 725 also comprises an interface operable for receiving haptic inputs from a user.

The haptic interface of the GUI 80 and touchscreen 725 may comprise, e.g., at least two arrays of microscopic (or transparent) conductors, each of which is insulated electrically from the other and disposed beneath a surface of the display 725 in a perpendicular orientation relative to the other. The haptic inputs comprise pressure applied to the surface of the touchscreen 725 and GUI 80, which cause corresponding local changes in electrical capacitance values proximate to the pressure application that are sensed by the conductor grids to effectuate a signal corresponding to the input.

The touchscreen display component 725 and GUI 80 are operable for rendering an interactive surface for receiving user inputs relating to the actuators 81 and 82 and for rendering the adjustment tracker 88 (FIG.8). Images and video received from the camera 766 may also be presented on the display 725.

The touchscreen 725 may be implemented operably for rendering images over a heightened (e.g., high) dynamic range (HDR). The rendering of the images may also be based on modulating a back-light unit (BLU). For example, the BLU may comprise an array of light emitting diodes (LEDs). The LCDs may be modulated according to a first signal and the LEDs of the BLU may be modulated according to a second signal. The touchscreen 725 may render an HDR image by coordinating the second modulation signal in real time, relative to the first modulation signal.

Other display technologies may also (or alternatively) be used. For example, the display 725 may comprise an organic LED (OLED) array. The display 725 may also (or alternatively) comprise a display operable over a standard dynamic range (SDR), sometimes also referred to as a "low dynamic range" (LDR).

An input receiver 714 may comprise one or more electromechanical switches, which may be implemented as buttons, escutcheons, microelectromechanical sensors (MEMS) or other sensors, dual in-line package (DIP) switch, etc. The input receiver 714 may also comprise cursor and trigger controls such as a mouse, joystick, etc. and/or a keyboard. The keyboard may comprise an array of alphanumeric and/or ideographic, syllabary based keys operable for typing corresponding letters, number, and/or other symbols. The keyboard may also comprise an array of directional (e.g., "up/down," "left/right") keys, operable for communicating commands and data selections to the CPU 704 and for controlling movement of a cursor rendering over the touchscreen display 725. The input receiver 714 may allow inputs for configuring the width 411 of the media substrate.

The directional keys may be operable for presenting two degrees of freedom of a cursor, over at least two perpendicularly disposed axes presented on the display component of the touchscreen 725. A first 'x' axis is disposed horizontally. A second 'y' axis, complimentary to the first axis, is disposed vertically. Thus, the printing evaluation system 300 is thus operable for specifying positions over a representation of a geometric plane and/or other coordinate systems.

Execution of instruction sequences contained in the storage media 710 and main memory 706 cause the CPU 704 to perform processing related to general operations of the computer 701, the DSP/GPU 744 to perform various other processing operations, and the components of the printing system 100 to perform processing steps related to the example method 20 (FIG. 2A). Additionally or alternatively, hard-wired circuitry may be used in place of, or in combination with the software instructions. Thus, the computer 701 is not limited to any specific combination of circuitry, hardware, firmware, or software.

The term "computer readable storage medium," as used herein, may refer to any non-transitory storage medium that participates in providing instructions to the various processor components of the computer 701 for execution. Such a medium may take various forms including, but not limited to, non-volatile media, volatile media, and transmission media. Non-volatile media comprises, for example, configured/programmed active elements of the GRUI 41 (and other components of the control system 40) the CPU 704, the DSP/GPU 744, the non-transitory image related media 710, stored instructions 783, and other optical, electronic, or magnetic media. Volatile media comprises dynamic memory associated, e.g., with the RAM 706.

Transmission media comprises coaxial cables, copper wire and other electrical conductors and fiber optics, including the wires (and/or other conductors or optics) that comprise the data bus 702.

Transmission media can also take the form of electromagnetic radiation (e.g., light waves), such as may be generated at a radio frequency (RF), and infrared (IR) and other optical frequencies. Data communications may also be effectuated using other means, including acoustic (e.g., sound related) or other mechanical, vibrational, or phonon related media.

Non-transitory computer-readable storage media may comprise, for example, flash drives such as may be accessible via universal serial bus (USB) or any medium from which the computer 701 can access, read, receive, and retrieve data.

Various forms of non-transitory computer readable storage media may be involved in carrying one or more sequences of one or more instructions to CPU 704 for execution. For example, the instructions may initially be carried on a magnetic or other disk of a remote computer (e.g., computer 798). The remote computer can load the instructions into its dynamic memory and send the instructions over networks 788.

The printing system 100 can receive the data over the network 788 and use an infrared (IR), radio frequency (RF), or other transmitter means to convert the data to corresponding signals. An IR, RF or other signal detector or receiver ("receiver") coupled to the data bus 702 can receive the data carried in the corresponding signals and place the data on data bus 702. The operations associated with the transmitter and the receiver may be combined in a transmitter/receiver (transceiver) means. The transmitter, receiver and/or transceiver means may be associated with the interfaces 718.

The data bus 702 carries the data to main memory 706, from which CPU 704 and the DSP/GPU 744 retrieve and execute the instructions. The instructions received by main memory 706 may optionally be stored on storage device 710 either before or after execution by CPU 704.

The interfaces 718 may comprise a communication interface coupled to the data bus 702. The communication interface is operable for providing a two-way (or more) data communication coupling to a network link 720, which may connect wirelessly over RF to the network 788. Wireless communication may also be implemented optically, e.g., at IR frequencies.

Signals may be exchanged via the interfaces 718 with an external device 799 (e.g., another computer or external storage device) through a compatible communication port 719. The input receiver 417 may provide signals to the GRUI 41 and other components of the control system 40 and the computer 701 via the port 719.

In any implementation, the communication interface 718 sends and receives electrical, electromagnetic or optical signals that carry digital data streams representing various types of information. The network link 720 provides data communication through the network 788 to other data devices. The input receiver 417 may provide signals to the printer system 100 and other components of the computer 701 via the network links 720 and/or the data communications network 788.

The network 788 may use one or more of electrical, electromagnetic, and/or optical signals carrying digital data streams. The signals sent over the network 788 and through the network link 720 and communication interface 718 carry the digital data to and from the printing evaluation system 300. The printing evaluation system 300 can send messages and receive data, including program code, through the network 788, network link 720 and communication interface 718.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;

U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;

U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTI-PURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTOCONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

Example embodiments of the present invention are thus described in relation to a system and method for printing media products. An example embodiment of the present invention relates to a system for printing an indicia on a graphic medium. An example embodiment of the present invention relates to a system for printing a graphic media product. The graphic media product comprises an indicia marked upon a media substrate. The system comprises a print mechanism, a detector, a sensor, and a processor operable for computing a center position of the media substrate.

The print mechanism is operable for marking the indicia upon the media substrate. The detector is operable for detecting an installation of a supply of the media substrate for feeding to the print mechanism, and for activating the sensor based on the detection of the installation of the media substrate. The sensor is operable for measuring a width of the installed media substrate. The processor is operable for computing a center position of the media substrate based on the measured width. The marking of the indicia is aligned relative to the computed center position of the media substrate.

Example embodiments of the present invention are thus useful for printing graphic media products. Example embodiments reduce reliance on users' knowledge and memory in configuring correct width settings for various media substrates. Example embodiments configure the width settings with sufficient correctness for printing of media products in conformance to quality standards and specifications, and to promote the clear communication of information presented therewith. Further, example embodiments reduce errors relating to the correct width measurement and the corresponding setting configurations, and related occurrence of printing failures or faulty and/or out-of-specification print products.

For clarity and brevity, as well as to avoid unnecessary or unhelpful obfuscating, obscuring, obstructing, or occluding features of an example embodiment, certain intricacies and details, which are known generally to artisans of ordinary skill in related technologies, may have been omitted or discussed in less than exhaustive detail. Any such omissions or discussions are neither necessary for describing example embodiments of the invention, nor particularly relevant to understanding of significant elements, features, functions, and aspects of the example embodiments described herein.

In the specification and/or figures, typical embodiments of the invention have been disclosed. The present invention is not limited to such example embodiments. The use of the term "and/or" includes any and all combinations of one or more of the associated listed items, and the term "or" is used in an inclusive (and not exclusive) sense. The figures are schematic representations and so are not necessarily drawn to scale. Unless otherwise noted, specific terms have been used in a generic and descriptive sense and not for purposes of limitation.

*

What is claimed, is:

1. An image forming apparatus, comprising:
   a print mechanism;
   a feeding mechanism for supplying a media substrate to the print mechanism;
   a detector operable for detecting an installation of the media substrate for feeding to the print mechanism;
   a sensor operable for measuring a width of the installed media substrate, wherein the sensor is configured to count truncated calibration dots positioned on the left and right of the media substrate; and
   a processor operable for:
      computing a center position of the media substrate based on the measured width; and
      printing a graphic media product on the media substrate such that the printed graphic media product is aligned relative to the computed center position of the media substrate.

2. The image forming apparatus of claim 1, wherein the feed mechanism is configured to feed the media substrate to the print mechanism along a direction of the feeding and the printing of the graphic media product.

3. The image forming apparatus of claim 1, wherein the detector is configured to activate the sensor upon detecting the installation of the media substrate.

4. The image forming apparatus of claim 1, wherein the computed center position is located along a line running longitudinally along a length of a plane corresponding to a surface of the media substrate and equidistant between a pair of opposing lateral edges thereof.

5. The image forming apparatus of claim 4, wherein the sensor is operable for measuring the length of the plane over the surface of the fed media substrate.

6. The image forming apparatus of claim 5, wherein the length is measured along the longitudinal line on which the computed center position is located.

7. The image forming apparatus of claim 1, comprising an input mechanism operable for inputting one or more setting adjustments over an adjustment range in relation to configuring a setting corresponding to the measured width.

8. The image forming apparatus of claim 1, wherein the media substrate comprises a plurality of marks disposed along at least one line perpendicular to one or more of a line running longitudinally along a length of a plane corresponding to a surface of the media substrate and equidistant between a pair of opposing lateral edges thereof, and each of a pair of opposing lateral edges.

9. The image forming apparatus of claim 8, wherein the media substrate comprises a plurality of gaps between each of the marks, wherein the gaps comprise one or more of a shade or a brightness at least approximating a shade or a brightness of the media substrate, wherein the marks comprise one or more of a shade, or a brightness darker than that of the gaps.

10. The image forming apparatus of claim 9, wherein one or more of the measuring the width of the installed media substrate with the sensor, or the computing the center position of the media substrate based on the measured width, comprises counting at least one of the gaps or the marks.

11. The image forming apparatus of claim 1, wherein the graphic media product comprises an indicia marked upon the media substrate.

12. The image forming apparatus of claim 1, wherein the image forming apparatus is implemented on a data network, wherein the data network comprises of a plurality of sub-networks.

13. An apparatus, comprising:
   a print mechanism;
   a sensor operable for measuring a width of a media substrate supplied to the print mechanism, wherein the sensor is configured to count truncated calibration dots positioned on the left and right of the media substrate; and
   a processor operable for:
      computing a center position of the media substrate based on the measured width; and
      printing a graphic media product on the media substrate such that the printed graphic media product is aligned relative to the computed center position of the media substrate.

14. The apparatus of claim 13, comprising a feed mechanism for supplying the media substrate to the print mechanism.

15. The apparatus of claim 13, comprising a detector for detecting the installation of the media substrate and activating the sensor to measure the width of the media substrate.

16. The apparatus of claim 13, wherein:
   the computed center position is located along a line running longitudinally along a length of a plane corresponding to a surface of the media substrate and equidistant between a pair of opposing lateral edges thereof;
   the sensor is operable for measuring the length of the plane over the surface of the media substrate; and
   the length is measured along the longitudinal line on which the computed center position is located.

17. An apparatus, comprising:
   a print mechanism;
   a sensor operable for measuring a width of a media substrate supplied to the print mechanism, wherein the sensor is configured to count truncated calibration dots positioned on the left and right of the media substrate;

an input mechanism for receiving input to configure a setting corresponding to the measured width; and a processor operable for:
computing a center position of the media substrate based on the measured width; and
printing a graphic media product on the media substrate such that the printed graphic media product is aligned relative to the computed center position of the media substrate.

18. The apparatus of claim 17, comprising a feed mechanism for supplying the media substrate to the print mechanism.

19. The apparatus of claim 17, comprising a detector for detecting the installation of the media substrate and activating the sensor to measure the width of the media substrate.

20. The apparatus of claim 17, wherein:
the computed center position is located along a line running longitudinally along a length of a plane corresponding to a surface of the media substrate and equidistant between a pair of opposing lateral edges thereof;
the sensor is operable for measuring the length of the plane over the surface of the media substrate; and
the length is measured along the longitudinal line on which the computed center position is located.

* * * * *